(12) United States Patent
Traskov et al.

(10) Patent No.: US 8,959,392 B2
(45) Date of Patent: Feb. 17, 2015

(54) REDUNDANT TWO-PROCESSOR CONTROLLER AND CONTROL METHOD

(75) Inventors: Adrian Traskov, Steinbachl (DE); Thorsten Ehrenberg, Nauheim (DE); Lukusa Didier Kabulepa, Erzhausen (DE); Felix Wolf, Frankfurt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 205 days.

(21) Appl. No.: 13/636,070

(22) PCT Filed: Mar. 18, 2011

(86) PCT No.: PCT/EP2011/054143
§ 371 (c)(1),
(2), (4) Date: Sep. 19, 2012

(87) PCT Pub. No.: WO2011/117155
PCT Pub. Date: Sep. 29, 2011

(65) Prior Publication Data
US 2013/0007513 A1  Jan. 3, 2013

(30) Foreign Application Priority Data
Mar. 23, 2010  (DE) .......................... 10 2010 003 161

(51) Int. Cl.
*G06F 11/00* (2006.01)
*G06F 11/16* (2006.01)

(52) U.S. Cl.
CPC .......... *G06F 11/165* (2013.01); *G06F 11/1641* (2013.01); *G06F 11/1645* (2013.01)
USPC .................. 714/10; 714/11; 714/30

(58) Field of Classification Search
CPC ................ G06F 11/16; G06F 11/1604; G06F 11/1608G06F 11/1629; G06F 11/1637; G06F 11/1641; ; G06F 11/6145; G06F 11/165; G06F 11/1654; G06F 11/22; G06F 11/2236; G06F 11/3024
USPC ..................... 714/10, 11, 12, 25, 30, 31, 47.1
See application file for complete search history.

(56) References Cited

U.S. PATENT DOCUMENTS

| 3,444,528 A | 5/1969 | Lovell et al. |
| 3,864,670 A | 2/1975 | Inoue et al. |

(Continued)

FOREIGN PATENT DOCUMENTS

| DE | 10 2009 000 045 A1 | 7/2010 |
| EP | 0 687 976 A1 | 6/1995 |

(Continued)

OTHER PUBLICATIONS

German Examination Report—Oct. 17, 2011.

(Continued)

*Primary Examiner* — Joseph D Manoskey
(74) *Attorney, Agent, or Firm* — Brinks Gilson & Lione

(57) ABSTRACT

A redundant two-processor controller having a first processor (1) and a second processor (1) for the synchronous execution of a control program. The controller having at least a first multiplexer (70, 91) for optionally connecting at least a first peripheral unit (72, 95) to be actuated to one of the two processors (1, 2), and at least a first Comparison unit (70, 91) for monitoring the synchronization state of the two processors (1, 2) and for detecting a synchronization error. A restoration control unit (44) is designed to monitor the execution of at least one test program by the two processors (1, 2) after the occurrence of a synchronization error and to evaluate the test results, and which is designed to configure at least the first multiplexer (70, 91).

15 Claims, 8 Drawing Sheets

(56) References Cited

U.S. PATENT DOCUMENTS

| | | |
|---|---|---|
| 5,249,188 A | 9/1993 | McDonald |
| 5,812,757 A * | 9/1998 | Okamoto et al. ............... 714/11 |
| 5,901,281 A | 5/1999 | Miyao et al. |
| 5,915,082 A | 6/1999 | Marshall et al. |
| 6,065,135 A | 5/2000 | Marshall et al. |
| 6,148,348 A * | 11/2000 | Garnett et al. ................. 714/12 |
| 7,366,948 B2 | 4/2008 | Michaelis et al. |
| 8,065,564 B2 * | 11/2011 | Nakatani et al. ............... 714/11 |
| 8,234,521 B2 * | 7/2012 | Graham et al. ................. 714/12 |
| 2004/0221195 A1 * | 11/2004 | Mizutani et al. ............... 714/12 |
| 2005/0246581 A1 * | 11/2005 | Jardine et al. .................. 714/12 |
| 2006/0107106 A1 | 5/2006 | Michaelis et al. |
| 2006/0150003 A1 * | 7/2006 | Abe ................................ 714/11 |
| 2006/0248384 A1 * | 11/2006 | Safford .......................... 714/11 |

FOREIGN PATENT DOCUMENTS

| | | |
|---|---|---|
| EP | 1 380 953 A1 | 1/2004 |
| SE | WO 99/30235 | 6/1999 |

OTHER PUBLICATIONS

PCT International Search Report—Mar. 18, 2011.

* cited by examiner

REDUNDANT TWO-PROCESSOR CONTROLLER AND CONTROL METHOD

CROSS-REFERENCE TO RELATED APPLICATIONS

This application claims priority to German Patent Application Number 10 2010 003 161.5, filed Mar. 23, 2012 and PCT/EP2011/054143, filed Mar. 18, 2011.

FIELD OF THE INVENTION

The following invention relates to a redundant two-processor controller and to a control method.

BACKGROUND AND SUMMARY OF THE INVENTION

Known error-tolerant system architectures comprise at least three processor cores with a divided memory or jointly used memory. In this context, the lockstep mode of the processors is continuously checked by monitoring bus signals. In the text which follows, the lockstep mode is also referred to as synchronous processing of a program or program parts by the processors.

If the active processor fails, the ownership of the memory area and components which are actuated by the active processor via input channels and output channels passes over to another processor. In the lockstep error state (synchronization error) which follows a lockstep error, data access and control processes are removed from the active processor and maintained by another processor. FIGS. 7 and 8 show conventional safety architectures.

The classic minimum configuration of an error-tolerant system, which comprises triple redundancy (TMR: Triple modular redundancy) of processors and of a jointly used memory is still an expensive solution for many safety architectures whose safety concept is based on the use of two redundant processors running in lockstep, or synchronously. However, error tolerance constitutes a particular challenge for processors with double redundancy.

Attempts have been made to assist the error tolerance capability in safety platforms with just two redundant processors. In U.S. Pat. No. 5,915,082 internal busses are provided with parity bits and compared. After a parity error has been detected on one side without the occurrence of a lockstep error, the associated processor is disconnected, with the result that it no longer has any influence on the system. However, the system is switched off after every lockstep error which occurs without a parity error. This procedure which is based on parity checking does not provide sufficient coverage in the cases in which the availability of a redundant system is very desirable after a lockstep error. The parity check can lead, for example, to an incorrect decision if different multi-bit errors are displayed.

US 2006/0107106 describes a method for assisting the availability in a system composed of a plurality of synchronously operating processor pairs. Two redundant processors are combined in each pair. The outputs of the paired processors are continuously compared. If an error occurs in one processor pair, another processor pair will assume the actuation of the system as a boot processor pair. In the meantime, the processor pair which is subject to errors will attempt to recover the synchronization and make itself available as a standby processor pair. This ensures a high level of availability of the system. However, this method is expensive for many embedded systems which, in particular, have to have a high level of availability, as far as possible with a single processor pair. In addition, any recovery of the synchronization of a processor must be subjected to strict safety-related checks in safety-relevant systems.

Against this background there is a need for a safety architecture which has just two redundant processors and which permits a high level of availability of the system.

This object is achieved by means of a two-processor control device as described and claimed herein. Furthermore, the present invention relates to a control method.

Further embodiments, modifications and advantages are described in the following description, drawings and in the claims.

According to one or more embodiments of the present invention, a redundant two-processor control device comprises a first processor and a second processor for the synchronous execution of a control program; at least a first multiplexer for optionally connecting at least a first peripheral unit to be actuated to one of the two processors and at least a first comparison unit for monitoring the synchronization state of the two processors and for detecting a synchronization error. Furthermore, the control device comprises a restoration control unit which is designed to monitor the execution of at least one test program by the two processors after the occurrence of a synchronization error and to evaluate the test results, and which is also designed to configure at least the first multiplexer.

The synchronization unit monitors the synchronous operation, i.e. the lockstep, of the processors. This can be done by comparing the processing of the control program "line by line", wherein the same results have to occur at the same times. If this is not the case, a lockstep error occurs, i.e. the processors are no longer operating synchronously.

The synchronous processing of the control program is an important feature of redundant systems since in this way it is possible to check whether the currently active processor is operating error-free, in which case it is then assumed that the simultaneous occurrence of the same error of both processors is statistically very improbable. However, if a synchronization error occurs, it is firstly unclear whether the error has occurred at the active processor or at the passive processor. The active processor is understood here to be the processor which actually actuates the peripheral unit. The passive processor is the one which merely runs along synchronously, i.e. it receives the same data and processes the same program steps as the active processor.

When a synchronization error occurs, it is no longer ensured that the control is carried out correctly i.e. there is a risk, in particular in the case of safety-relevant systems such as are used, for example, in the field of automobiles but also in other fields. The control system, for example those shown in FIGS. 7 and 8, must usually be completely switched off.

In the solution proposed here, a restoration control unit is provided which, when a synchronization error occurs, subjects the two processors to a test in order to determine which of the two processors is has an error. After the test and evaluation of the test results, the restoration control unit decides on the further procedure.

If both processors have passed the test, it is assumed that both processors are error-free. In this case, the synchronous execution of the control program is continued.

This solution has the decisive advantage that the actuation of the peripheral unit can be continued while the high safety level is maintained, this is because the two processors have been subjected to a test for freedom from errors. This is a decisive advantage compared to other solutions in which, after the occurrence of a synchronization error (lockstep error), basically complete switching off occurs and the system can only be reset again externally. In this context it is necessary to bear in mind the fact that the mere reset of a system frequently does not constitute a satisfactory solution for safety-relevant applications since no error evaluation is performed, i.e. it remains unknown what has led to the synchronization error. The solution described here therefore offers a way of dealing with synchronization errors and permits the synchronization of two redundant systems to be recovered after a lockstep error.

On the other hand, if a processor has been evaluated as having an error, the control device is reconfigured by the restoration control unit, specifically in such a way that the outputs of the processor with an error are ignored from then on and it is ensured that the peripheral unit can then only be actuated by the error-free processor but not by the processor with an error. This is typically done by reconfiguring the first mmultiplexer with the result that a flow of data is then only possible between the peripheral unit and error-free processor. Furthermore, the reconfiguration leads to a situation in which the comparison unit no longer carries out any monitoring.

This solution has the decisive advantage that the actuation of the peripheral unit can be continued even if this now takes place without redundancy on the processor side. This is a considerable advantage over known solutions in which the control was completely switched off when a synchronization error (lockstep error) occurred. The proposed solution increases the availability of the system here, which is particularly important in the case of critical applications, so that the control over the system can be maintained. The control device can, however, output an error signal in order then to indicate that only "single-processor operation" is then occurring, and then maintenance can take place.

The redundant control device proposed here with means for dealing with a synchronization error can be used in any desired safety-relevant systems. An example in braking applications in the field of automobiles. The control device which is based on only two redundant processors is in this case configured in such a way that it retains the safety level which is present and permits a high level of availability of the system.

The peripheral unit to be actuated can in principle be understood to mean any unit which is accessed by the respective processor. Examples are memories, actuators, input/output units and sensors.

According to one or more embodiments of the present invention, the restoration control unit is designed in such a way as to assign the synchronization error to an error type and to select a test program on the basis of the error type. The error which has occurred is analyzed in order to find out where the error may have occurred or which of the components caused the error. On this basis, a suitable test program is then selected, wherein the test programs and the expected test results are stored in advance, for example in the restoration control unit. If the error, i.e. the difference between the two processor outputs, points to a different memory address, for example a test program can be selected with which memory errors can be detected. This procedure improves the error localization process.

According to one or more embodiments of the present invention, the restoration control unit is designed to configure the first multiplexer on the basis of the test result. The multiplexer, and generally the control device, is therefore configured as a function of the test result. It is possible for the function of the multiplexer to be performed by a bus matrix.

According to one or more embodiments of the present invention, the control device also has at least a second multiplexer for optionally connecting at least one second peripheral unit to be actuated to one of the two processors, wherein the second multiplexer can be configured by means of the restoration control unit. The control device therefore also permits the optional actuation of a plurality of peripheral units while taking into account the safety aspects.

According to one or more embodiments of the present invention, the control device also has at least a second comparison unit for monitoring the synchronization state of the two processors and for detecting a synchronization error. This permits reciprocal monitoring and therefore increases the reliability of the system.

According to one or more embodiments of the present invention, the control device has a first bus matrix which connects the first processor to the first multiplexer, and a second bus matrix which connects the second processor to the second multiplexer.

According to one or more embodiments of the present invention, the first peripheral unit is a common unit which can be optionally actuated by one of the two processors. Furthermore, the control device has at least two further peripheral units, wherein one of the two peripheral units is assigned only to the first processor, and the other of the two peripheral units is assigned only to the second processor as a private peripheral unit which can be accessed only by the respectively assigned processor. A common peripheral unit or component is understood here to be a unit which is actuated redundantly, i.e. the actuation is carried out optionally by one of the two processors, wherein the other serves for comparison. On the other hand, a private unit is actuated by just one of the two processors in each case. The respective other processor has no access to this unit, and has no access to the multiplexer or multiplexers either. The solution presented here permits the restoration of the synchronization between two redundant processors, even while taking into account non-redundant components which are typically implemented in various embedded systems for reasons of cost.

According to one or more embodiments of the present invention, the two further peripheral units are redundant units, i.e. they are physically identical and serve to carry out the same function.

According to one or more embodiments of the present invention, the first and/or the second comparison unit are/is designed to generate a synchronization error signal when a synchronization error occurs. The synchronization error signal may be, for example, an interrupt.

According to one or more embodiments of the present invention, a control method is made available. The control method comprises the synchronous processing of a control program by a first and a second processor which are connected via a multiplexer to at least one peripheral unit to be actuated, wherein just one of the two processors actuates the peripheral unit at a specific time. The synchronous processing of the control program is monitored by a comparison unit. A synchronization error signal is output if the two processors are desynchronized. After a synchronization error signal has been output, the processing of the control program is first interrupted by the two processors. A test is then carried out to check whether one of the two processors is has an error. If both processors are fault-free, the synchronous processing of the control program by the two processors is continued. If, on the other hand, one of the two processors has been detected as having an error, the multiplexer and the comparison unit are configured in such a way that no further communication takes place with the processor with an error and no further monitoring by the comparison unit takes place, and that the error-free processor actuates the peripheral unit. The processing of the control program is continued by the error-free processor. If both processors have errors, the controller is switched off.

According to one or more embodiments of the present invention, the test comprises the simultaneous execution of at least one test program by both processors, wherein a processor is considered to have an error if at least one of the following conditions is met:

the processor has not processed the test program within a first time period T1, the processor has not successfully processed the test program, the processor has not gone into the state of rest for a second time period T2 after expiry of the first time period T1.

This is intended to ensure that not only the correct or incorrect processing is taken into account but also whether the processors have processed the test within a predefined time. The checking of the state of rest serves to determine whether a processor, even though not processing any instructions, nevertheless outputs data. This also indicates an error processor.

According to one or more embodiments of the present invention, the synchronization error is evaluated and is assigned to an error type, wherein, for the checking of the processors, at least one test program is selected as a function of the error type. This permits one or, if appropriate, more error-specific test programs to be selected.

The invention will now be described with reference to specific exemplary embodiments illustrated in the figures. However, said embodiments should not be considered to be restrictive. For a person skilled in the art, the following description provides further modifications which are also to be included in the scope of protection.

DETAILED DESCRIPTION OF THE INVENTION

Figure 1:
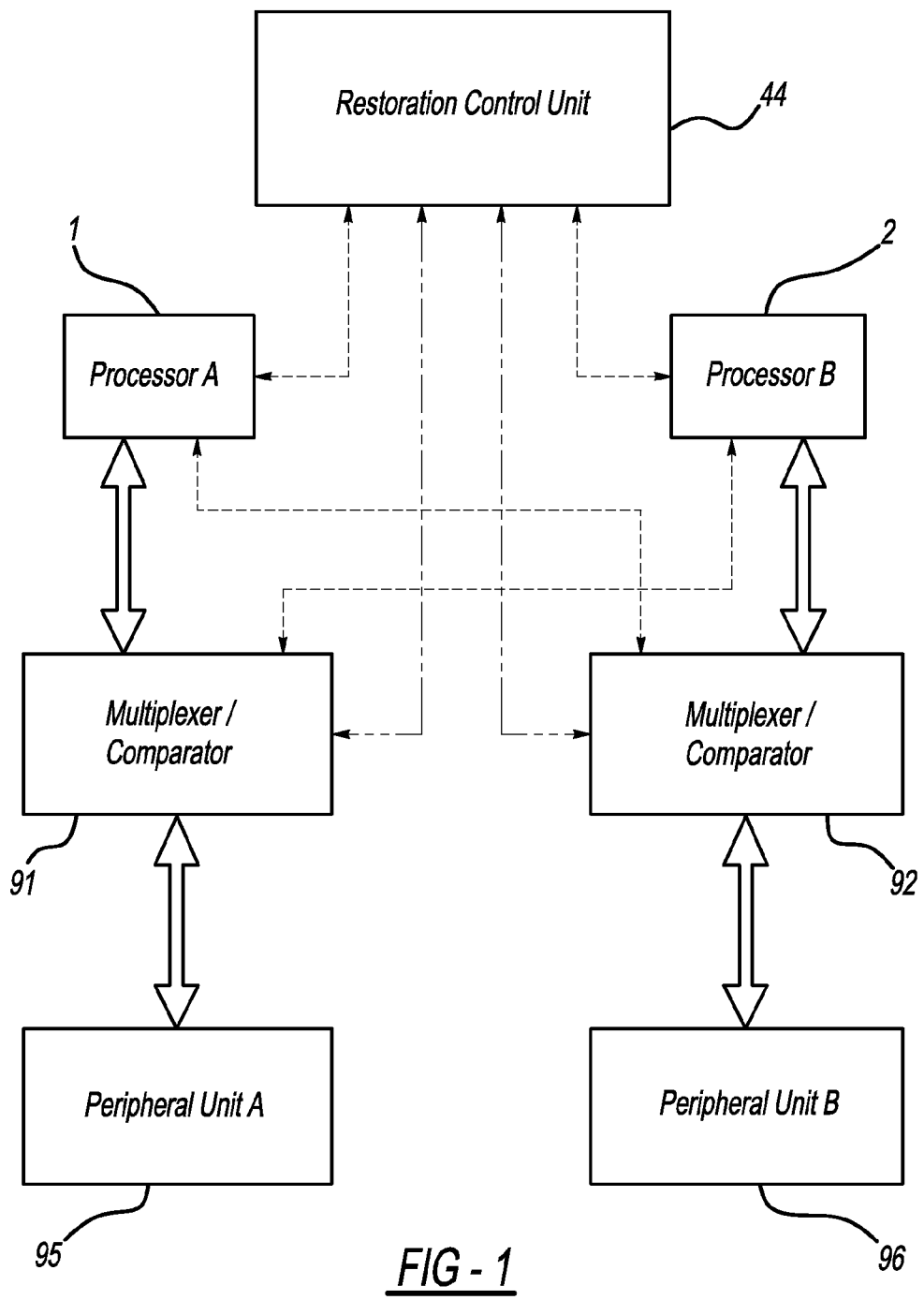
FIG. 1 shows a control device according to an embodiment of the present invention in the normal operating mode.

FIG. 1 shows a schematic control device having a first and a second processor 1, 2 (denoted as CPU A and CPU B, respectively) and a first and second multiplexer 91, 92. Each of the multiplexers 91, 92 forms a unit with in each case one comparison device which is denoted as a multiplexer/comparator in the figures. Each of the multiplexers 91, 92 is connected to, in case, one peripheral unit 95, 96 and permits optional access by the processors 1, 2 to the peripheral units 95, 96. A restoration control unit 44 is connected both to the two processors 1, 2 and to the multiplexers 91, 92.

The processors 1, 2 may also be processor cores.

The bold arrows illustrated in FIG. 1 show the data flow from the processors 1, 2 to the peripheral units 95, 96 which is actually facilitated by the multiplexers 91, 92. The processor 1 communicates with the peripheral unit 95 and controls it, and the processor 2 communicates with the peripheral unit 2 and controls it. The processor 1, multiplexer 91 and peripheral unit 95 form here a branch A, while processor 2, multiplexer 92 and peripheral unit 96 form a branch B. However, there are criss-cross communication paths, to be precise, on the one hand, between the processor 2 and the multiplexer 91 and, on the other hand, between the processor A and multiplexer 92.

The multiplexers (with comparator function) 91, 92 each compare whether the processors operate synchronously with one another, i.e. whether they synchronously output the same results. If this not the case, a synchronization error is present. In this case, the processors 1,2 are tested and the control device is reconfigured as a function thereof. This is illustrated schematically in FIG. 2.

Figure 2:
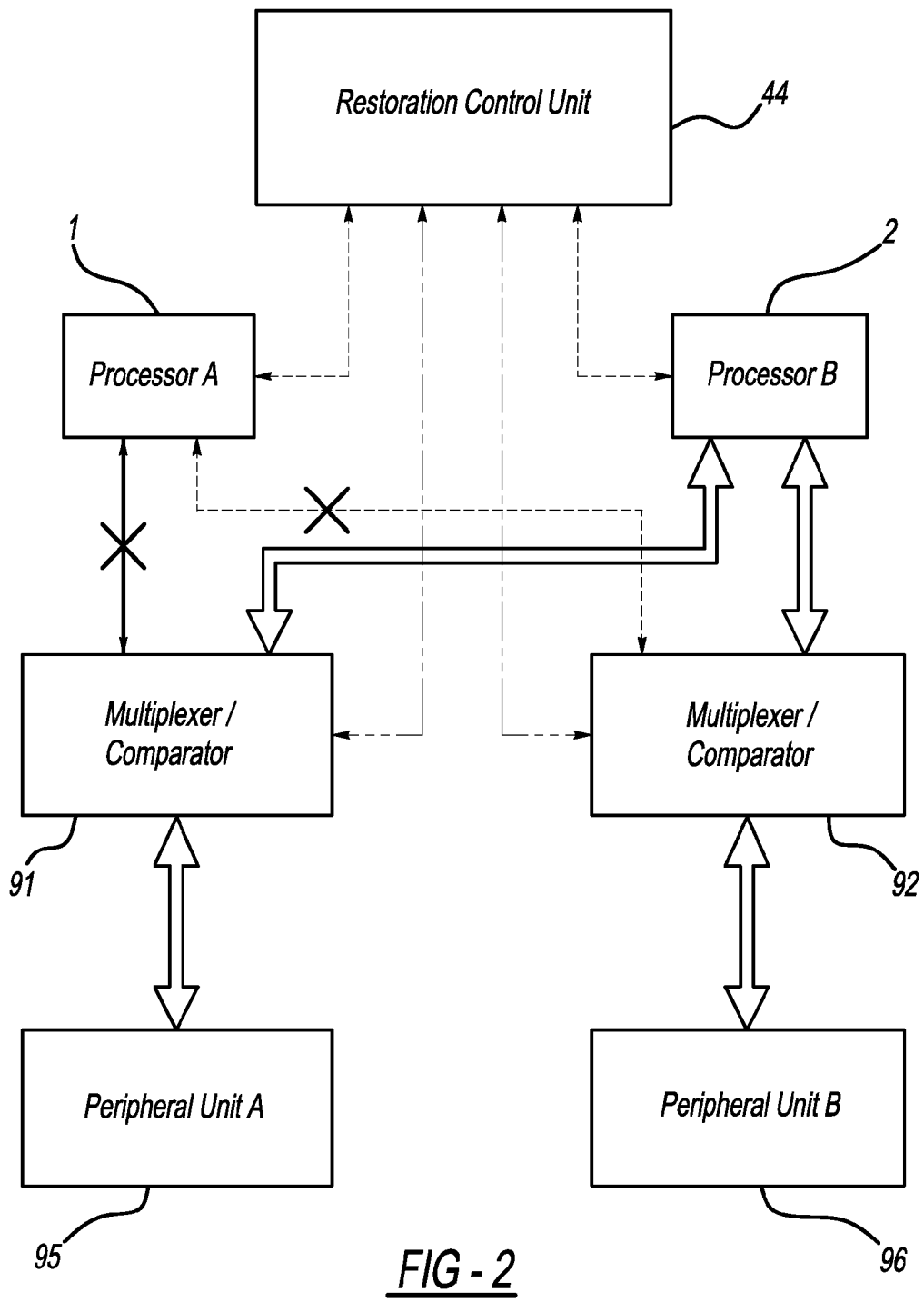
FIG. 2 shows the control device in the event of failure of a processor.

In FIG. 2 it was assumed that the test which is monitored and evaluated by the restoration control unit 44 has revealed that the processor 1 is defective. In this case, the two multiplexers 91, 92 are reconfigured, specifically in such a way that both multiplexers 91, 92 ignore the outputs of processor 1. At the same time, multiplexer 91 then permits communication between the processor 2 and the peripheral unit 95. The processor 2 then actuates the peripheral units 95, 96 both in the branch A and in the branch B. For this purpose, the processor 2 does not necessarily have to be differently programmed since, of course, processor 2 has, for comparison purposes, already executed the control program for the peripheral unit 95 (branch A) in the normal state. The difference is only that it can now also access peripheral unit 95 in a "writing" fashion. Furthermore, the comparison function of the multiplexers 91, 92 is deactivated since they now no longer receive any further inputs from the processor 1. This is necessary to prevent the multiplexers 91, 92 outputting any further error signals.

As a result, the processing of the control program, comprising the control program for the peripheral unit 95 and the peripheral unit 96, can be continued. As a result, the availability of the system is increased.

If the test has revealed that both processors 1, 2 are error-free, the state from FIG. 1 is assumed again. If both processors are defective, the system is switched off.

The procedure shown in FIGS. 1 and 2 is advantageous, in particular in the case of peripheral units which are not configured in a redundant fashion.

The architecture shown in FIGS. 1 and 2 comprises division of peripheral modules into two groups A and B. Each group comprises at least one processor 1, 2, a bus switch (bus matrix, bus cross bar) not shown here and peripheral units 95, 96 to be actuated. Memory modules can be implemented in one group or in both groups. The side A is always actually (that is to say physically) actuated by the processor 1 (processor A). The side B is always actually actuated by the processor 2 (processor B). Data of the peripheral unit 95 can be passed transversely to the side B via the multiplexers 91, 92. The processor 1 can similarly read out data from peripheral unit 96.

Figure 3:
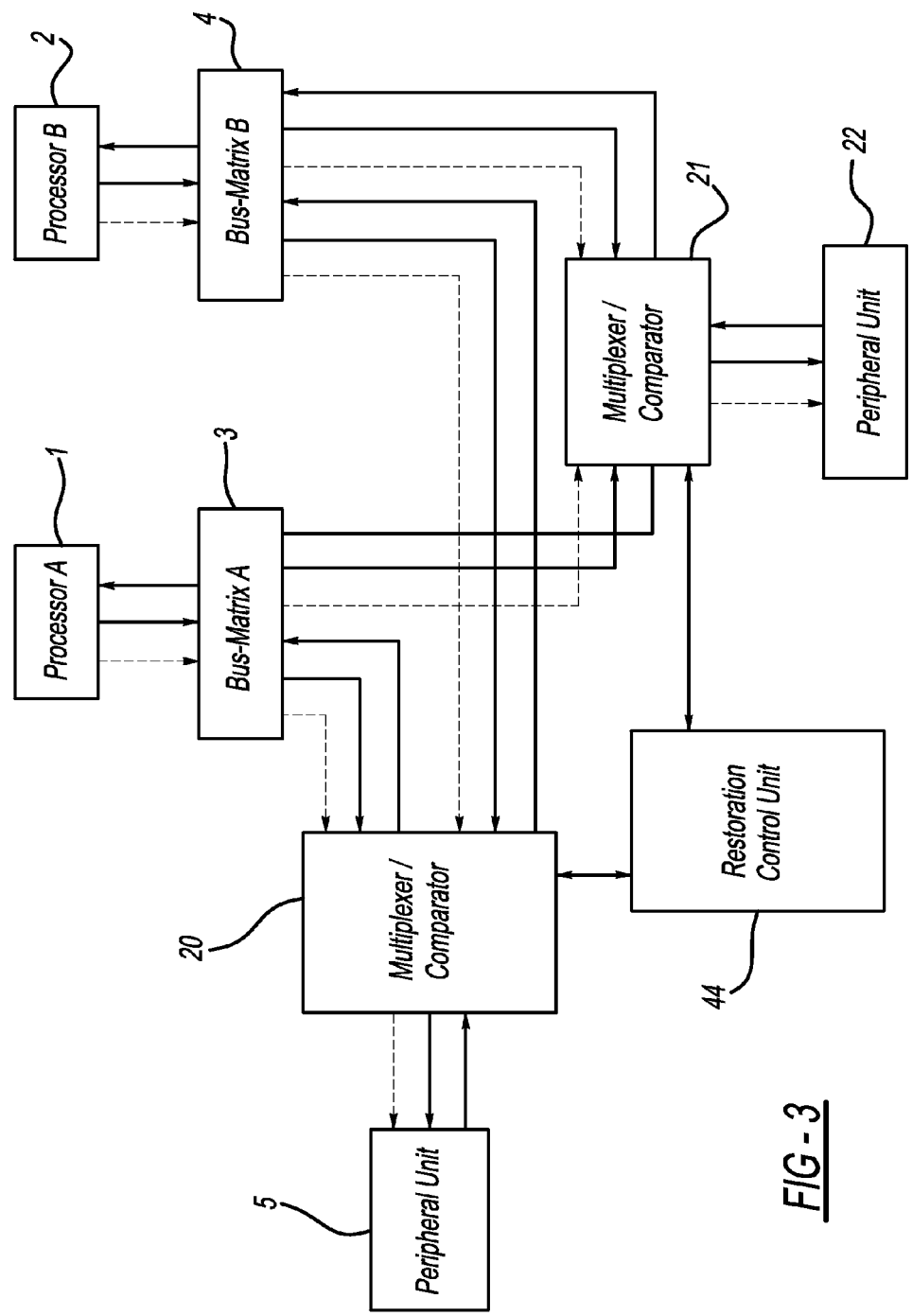
FIG. 3 shows a control device according to one embodiment.

FIG. 3 shows an embodiment in which a peripheral unit 22, which is denoted there as a peripheral module, is actuated redundantly by two processors 1 and 2, wherein actually just one of the two processors actuates the unit 22 at a predefined time. This is done by means of a multiplexer 21. A further peripheral unit 5, which may be a common internal peripheral unit, for example a memory, is connected to the two processors 1, 2 via a multiplexer 20. The processors 1, 2 are each connected via a bus matrix 3, 4 to the multiplexers 20, 21. In this embodiment, too, the multiplexers 20, 21, which are present in a unit with respective comparison units (comparators), can be suitably configured in the event of an error, in order to keep the control available.

According to one or more embodiments, there is a clear separation between the commonly used areas, and the private redundant areas, of the controller. Each processor 1, 2 is assigned private components or units which are actuated only by it. The private components (in FIG. 4 the two peripheral units 61, 63) are preferably redundant in order to be able to simulate as far as possible a perfect symmetry of the redundant private areas. For reasons of cost, a number of components, such as for example the program memory, are implemented only once, specifically in the jointly used area. In the lockstep mode, the two processors 1, 2 operate synchronously. The actual actuation of the jointly used components or peripheral units can be assumed by either of the two redundant processors and is actually carried out by just one processor at a specific time, while the other processor obtains all the data in good time owing to the lockstep mode.

After the detection of a lockstep error, each processor 1, 2 is to remain active as far as possible in the assigned private area during a time interval T1 and is not to carry out any safety-relevant function with effects outside the architecture. That is to say, in particular, the actuation of external peripheral units or components which exhibit an effect toward the outside, is interrupted.

For the necessary access operations to non-redundant components such as, for example, to the program memory, a multiplex mode for the two redundant processors 1, 2 is made possible in the time interval T1. Each lockstep error triggers an interrupt in the program sequence. In the interrupt routine, the processors 1, 2 will execute the same test programs independently of one another and store test results for later checking by means of an autonomous hardware monitoring module, in the figures the restoration control unit 44.

Many test programs can be derived from the error context. For example, the error which has occurred is classified and is assigned to an error type, and this assignment is used for the selection of the respective test program or programs.

Each processor is intended to exit the processing of the interrupt gently without a rebound. The background is that the test program was started by an interrupt and, after the test program ends the processors 1, 2 normally wish to continue again the control program which was interrupted owing to the interrupt. This is to be prohibited, and the processors 1, 2 are instead to go into a state of rest. Whether this takes place is also a part of the test.

Each processor is to subsequently store its status features, for example, in a register which can be read by the autonomous hardware monitoring module (restoration control unit 44). The time period is measured on the basis of a timer of the autonomous hardware monitoring module.

After this unclear time (outside the lockout mode) the redundant processors are to have an idling mode (state of rest) for a time period T2. If a processor in the time period T2 accesses a component such as, for example, a memory module or peripheral module, it is automatically excluded from the recovery process by the restoration control unit 44. After the time window T2, the restoration control unit 44 compares the test results of the two processors 1, 2 with the values preprogrammed in the hardware. If the test results of a processor do not correspond to the predefined values, the corresponding processor is no longer considered for the running synchronization attempt. Accordingly, the stored status features of the processors 1, 2 must also be suitable for a recovery. In the case of a positive evaluation of the results, the restoration control unit 44 will bring about a return into the lockstep mode by means of an interrupt. If only one processor has successfully carried out all the tests, it will actuate the peripheral modules assigned to it and all the components used jointly.

This emergency operating mode increases the availability of the system and runs with a reduced safety level.

Figure 4:
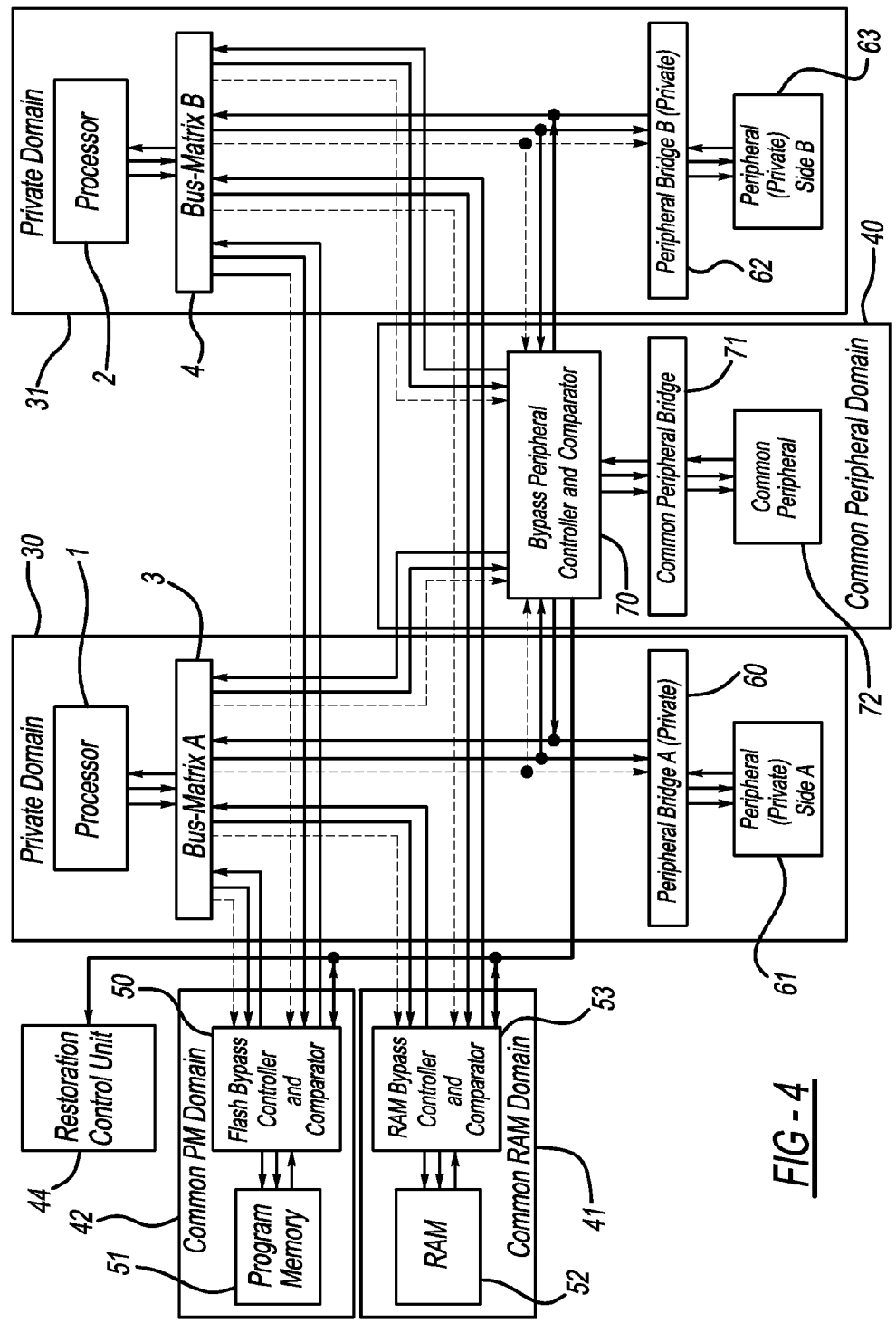
FIG. 4 shows a control device according to one embodiment.
Figure 5:
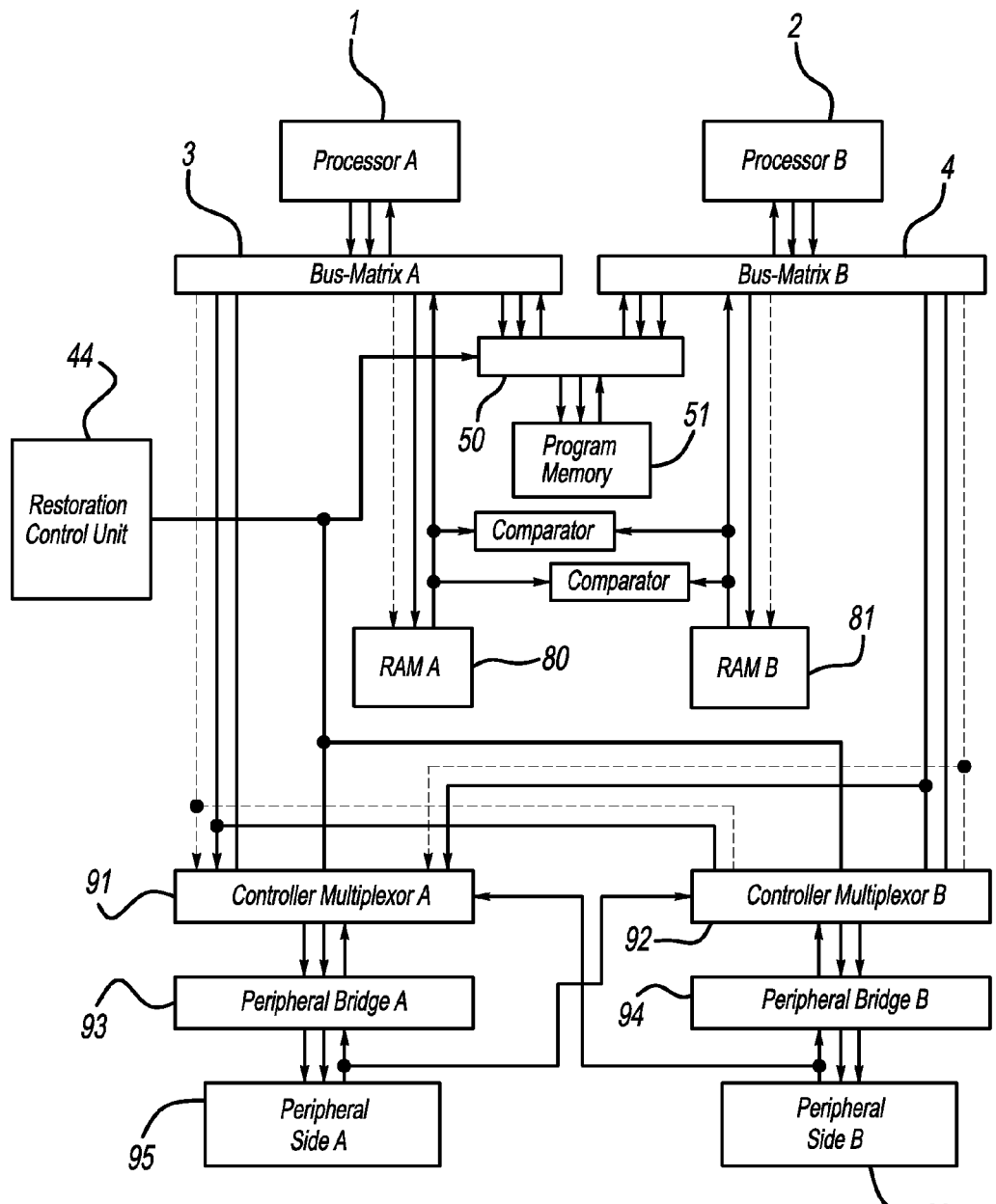
FIG. 5 shows a control device according to one embodiment.

FIG. 4 shows a further embodiment which is based on FIG. 3. The architecture of the control device is divided into two private areas 30 and 31, which are denoted as areas A and B, and a common area 40. The private areas contain modules or peripheral units and components which are physically redundant. The restoration control unit 44 in the form of a hardware module serves for reliably recovering the synchronization after a lockstep error. If a lockstep error occurs, the restoration control unit 44 will block all the access operations to safety-relevant peripheral modules or units. These units are, in particular, the common peripheral 72 and, as an example, the redundant peripheral units 61 and 63 which are present. These are connected via respective peripheral bridges 60, 71 and 62.

The lockstep error triggers an interrupt of the program sequence. In the following processing of the interrupt routine, each processor 1, 2 can access only modules which are located in a private area assigned to it and do not carry out safety-relevant partial functions. Furthermore, the access to non-safety-relevant components 41, 42 can be made possible in the multiplex mode. Such components 41, 42 are, for example, a common program domain 42 and a common RAM domain 41. The component 42 has a module 50 which comprises a multiplexer, a controller and a comparator, and the actual program memory 51. The component 41 has a module 53 which comprises a multiplexer, a controller and a comparator, and the memory 52 which is embodied here as a RAM.

In the private peripheral area, in each case a small address space is reserved for test purposes of the suitable processor. The interrupt routine serves to check the integrity of the architecture and, above all, of the processors. At the end of the interrupt processing, the processors are to store the calculated results in the address area which is reserved for test purposes. Correct results are stored in advance in the restoration control unit 44. The interrupt routine is composed of test programs, each test program being intended to supply the correct result within a specific time interval. After a predefined time period, the restoration control unit 44 checks the correctness of the results stored by the processors. The recovery of the lockstep mode presumes that all the results to be checked by the restoration control unit 44 are correct. Otherwise, only the processor which has correct results will remain active for the running application.

Since the interrupt routine does not run in the lockstep mode, the module 50 is configured in such a way that both processors 1, 2 can access the program in the multiplex mode.

Shows an embodiment as an extension of FIGS. 1 and 2. In this context, the restoration control unit 44 operates in a similar way to that in FIG. 4. If a processor 1, 2 does not supply any correct results for the recovery of the lockstep mode, the restoration control unit 44 will configure the corresponding peripheral controllers 91 or 92, which form the multiplexers and comparators here, in such a way that the peripheral modules or units 95, 96 below them are actuated by the other processor.

The architecture in FIG. 4 also has two redundant RAM modules 80, 81. If the lockstep error has been caused by an error in the RAM, the address of the errored RAM is stored. This address is checked in the interrupt routine. If the RAM fault cannot be corrected, the restoration control unit 44 will not integrate the respective side A or B (that is to say the processor and RAM) into the active actuation again. The restoration control unit 44 will subsequently ensure that the peripheral modules which were previously actuated by the processor or RAM which now has an error, are now actuated by the processor on the other side.

Figure 6:
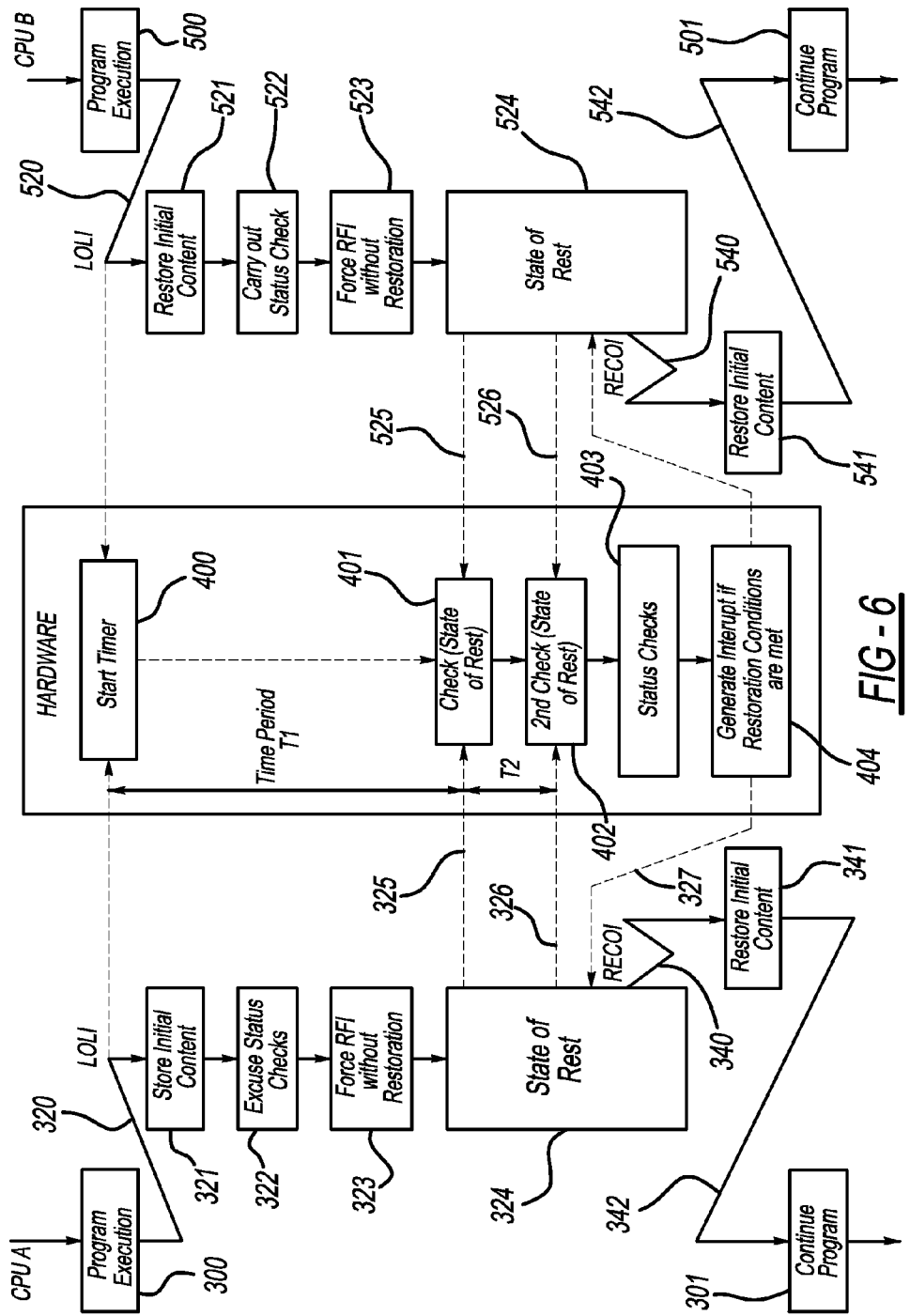
FIG. 6 shows the sequence of a control program according to one embodiment.

FIG. 6 is a schematic view of the sequence of a control program. After a synchronization error occurs, the program execution 300, 500 is interrupted by the respective processors by means of an interrupt (LOLI, Lockstep Loss Interrupt) and the respective status (initial content) is stored in 321, 521. The interrupt leads simultaneously to the activation of the restoration control unit, referred to here as hardware.

The restoration control unit starts a timer 400. The processors then carry out, in step 322, 522, the tests predefined by the restoration control unit, wherein after the ending of the test an interrupt-free return to 323, 523 is forcibly brought about (RFI, Return From Interrupt). The processors should then go into a state of rest.

The restoration control unit checks whether the tests have been processed within the time period T1 (325, 525) and whether the processors have gone into the state of rest (401). After a predefined time period T2, the restoration control unit checks in 402, 326, 526 whether the processors are still in the state of rest.

The test results are then checked. The restoration conditions 404 are that the test results are error-free, that the respective processor had gone into the state of rest by the expiry of the time period T1, and that the processor is still in the state of rest after the expiry of the time period T2. If this is the case for both processors, a recover interrupt (RECOI) is triggered for both processors, otherwise only for the processor which is error-free, and the initial state is restored (341, 541). In the latter case, the restoration control unit reconfigures the control device, as explained above. This is followed by continuation of the program.

Figure 7:
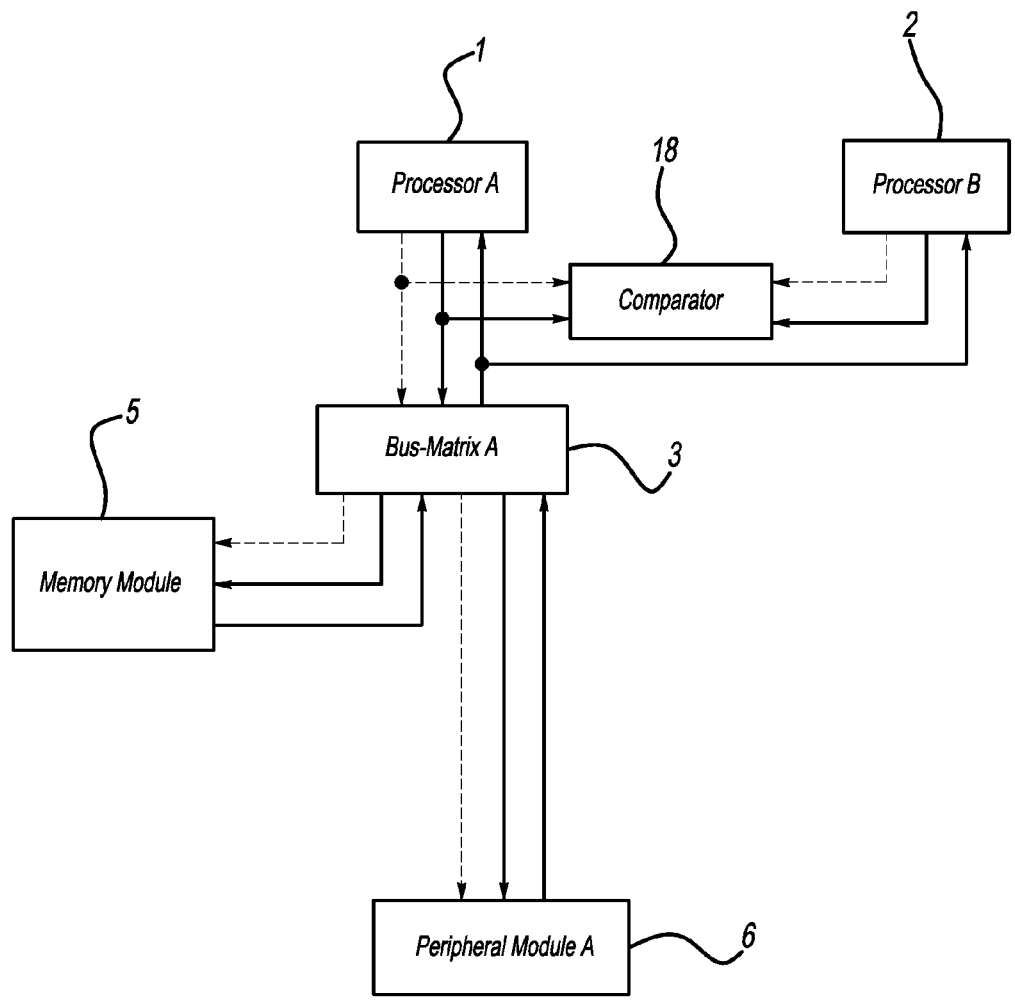
FIG. 7 shows an architecture with two processors.

FIG. 7 shows a conventional architecture with two processors 1 and 2, wherein the processor 2 serves to monitor the processor 1. The entire actuation of peripheral modules and all the memory access operations take place via the processor 1. This architecture is unsuitable for coping with errors (lockstep failures) which result from the loss of synchronization.

Figure 8:
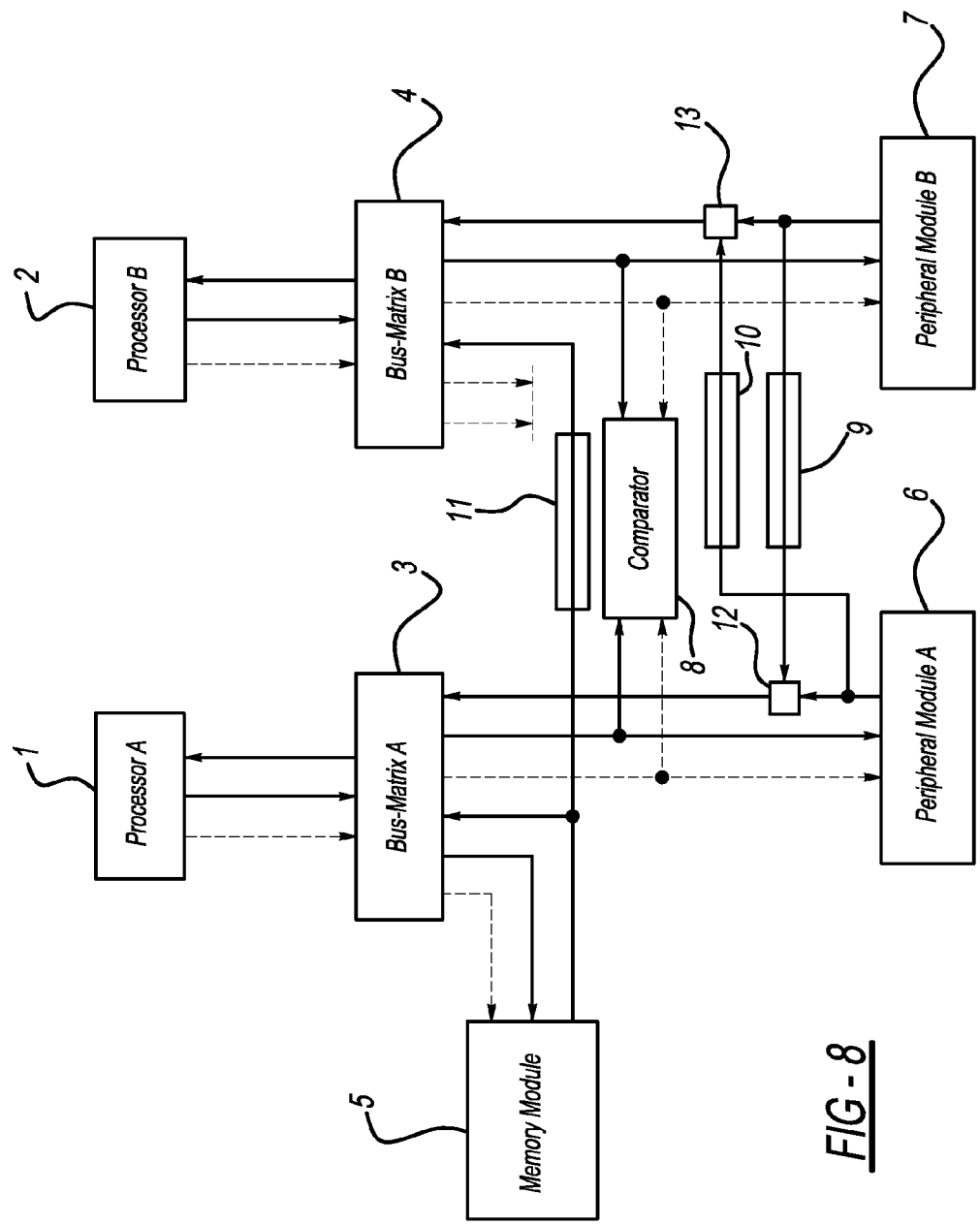
FIG. 8 shows an architecture with division of peripheral modules into two groups A and B.

FIG. 8 shows a conventional architecture with a division of the peripheral modules into two groups A and B. Each group comprises at least one processor 1, 2, a bus switch (bus matrix, bus crossbar) 3, 4 and peripheral modules 6, 7. Peripheral modules 5 can be implemented in one group or in both groups and actuated by means of a bypass module 11. The side A is actually (that is to say physically) always actuated by the processor 1. The side B is actually always actuated by the processor 2. Data from peripheral modules 6 can be passed onto the side B transversally via a bypass module 10 and data multiplexer 12. The processor 1 can read out data from peripheral modules 6 in a similar way (via bypass module 9 and data multiplexer 13). This mechanism, with which a processor can read out peripheral data from the other side, functions only for as long as the two processors 1 and 2 operate synchronously (in lockstep) with one another. The monitoring is carried out by means of a comparator 8. If the processor 1 is, for example, non-operational, the entire side A (that is to say together with peripheral modules and memory on this side) can no longer be actuated. This results in poor support of a high level of availability. If the two processors no longer operate synchronously, they can then only be reset. For many safety-relevant applications, the reset of processors is not allowed until the cause of the loss of synchronization has been clearly identified.

The invention is not restricted to the exemplary embodiments described above but rather can be suitably expanded and modified. The following claims constitute a first, non-binding attempt to define the invention generally.

The invention claimed is:

1. A redundant two-processor controller, comprising:
a first processor and a second processor for the synchronous execution of a control program;
at least a first multiplexer for optionally connecting at least a first peripheral unit to be actuated to one of the first and second processors, wherein the first processor is a primary processor for the first peripheral unit and the second processor is a secondary processor for the first peripheral unit;
at least a second multiplexer for optionally connecting at least one second peripheral unit to be actuated to one of the first and second processors, wherein the second processor is the primary processor for the second peripheral unit and the first processor is the secondary processor for the second peripheral unit;
at least a first comparison unit for monitoring the synchronization state of the first and second processors and for detecting a synchronization error; and
a restoration control unit which is designed to monitor the execution of at least one test program by the first and second processors after the occurrence of a synchronization error and to evaluate the test results, and which is designed to configure at least the first multiplexer and the second multiplexer.

2. The redundant two-processor control device as claimed in claim 1, wherein the restoration control unit is designed to assign the synchronization error to an error type and to select a test program on the basis of the error type.

3. The redundant two-processor control device as claimed in claim 1 wherein the restoration control unit is designed to configure the first multiplexer (70, 91) on the basis of the test result.

4. The redundant two-processor control device as claimed in claim 1 further comprising:
at least a second comparison unit for monitoring the synchronization state of the first and second processors and for detecting a synchronization error if the first and second processors are desynchronized.

5. The redundant two-processor control device as claimed in claim 4, wherein the first or the second comparison unit is designed to generate a synchronization error signal when a synchronization error occurs.

6. The redundant two-processor control unit as claimed in claim 1 further comprising:
a first bus matrix which connects the first processor to the first multiplexer; and
a second bus matrix which connects the second processor to the second multiplexer.

7. The redundant two-processor control device as claimed in claim 1, wherein the first peripheral unit is a common unit which can be optionally actuated by one of the first and second processors, also comprising:
at least two further peripheral units, wherein one of the two peripheral units is assigned only to the first processor, and the other of the two peripheral units is assigned only to the second processor as a private peripheral unit which can be accessed only by the respectively assigned processor.

8. The redundant two-processor control device as claimed in claim 7, wherein the two further peripheral units are redundant units.

9. A redundant two-processor control device comprising:

a first processor and a second processor for the synchronous execution of a control program;

at least a first multiplexer for optionally connecting a common first peripheral unit to one of the first and second processors, wherein the first processor is a primary processor for the common first peripheral unit and the second processor is a secondary processor for the common first peripheral unit;

at least two further peripheral units, wherein one of the two peripheral units is assigned only to the first processor, and the other of the two peripheral units is assigned only to the second processor as a private peripheral unit which can be accessed only by the respectively assigned processor;

at least a first comparison unit for monitoring the synchronization state of the first and second processors and for detecting a synchronization error if the first and second processors are desynchronized; and a restoration control unit which is designed to monitor the execution of at least one test program by the first and second processors after the occurrence of a synchronization error and to evaluate the test results, and which is designed to configure the first multiplexer on the basis of the test result wherein the restoration control will configure the first multiplexer such that the second processor to act as the primary processor unit based on the test results.

10. The redundant two-processor control device as claimed in claim 9, further comprising:

a first bus matrix which connects the first processor to the first multiplexer; and a second bus matrix which connects the second processor to the first multiplexer.

11. A redundant two-processor control device, comprising:

a first processor and a second processor for the synchronous execution of a control program;

at least a first and a second peripheral unit, wherein the first processor is a primary processor for the first peripheral unit and a secondary processor for the second peripheral unit, and wherein the second processor is the primary processor for the second peripheral unit and the secondary processor for the first peripheral unit;

at least a first multiplexer for optionally connecting the first peripheral unit to one of the first and second processors;

at least a second multiplexer for optionally connecting the second peripheral unit to one of the first and second processors;

at least a first and a second comparison unit for respectively monitoring the synchronization state of the first and second processors and for detecting a synchronization error; and a restoration control unit, which is designed to monitor the execution of at least one test program by the first and second processors after the occurrence of a synchronization error and to evaluate the test results, and which is designed to configure the first and second multiplexers on the basis of the test results, wherein the restoration control will configure the first multiplexer such that the second processor acts as the primary processor for the first peripheral unit based on the test results or configure the second multiplexer such that the first processor to act as the primary processor for the second peripheral unit based on the test results.

12. The redundant two-processor control device as claimed in claim 11, further comprising:

a first bus matrix which connects the first processor to the first multiplexer;

a second bus matrix which connects the second processor to the second multiplexer.

13. A control method, comprising:

synchronous processing of a control program by a first and a second processor which are connected via a multiplexer to a first and second peripheral units to be actuated, wherein one of the first and second processors actuates the first and second peripheral units at specific times, wherein the first processor is a primary processor for the first peripheral unit and the second processor is a secondary processor for the first peripheral unit and wherein the second processor is the primary processor for second peripheral unit and the first processor is the secondary processor for the second peripheral unit;

monitoring of the synchronous processing of the control program by a comparison unit and outputting of a synchronization error signal if the first and second processors are desynchronized; provided the synchronization error signal has been output;

interruption of the processing of the control program by the first and second processors;

execution of a test for checking whether one of the first and second processors has an error; and if both the first and second processors are error-free, continuation of the synchronous processing of the control program by the first and second processors, or if one of the first and second processors has been detected as having an error, reconfiguration of the multiplexer and of the comparison unit in such a way that no further communication with the processor with an error takes place and no further monitoring by the comparison unit takes place, and in that the error-free processor actuates the peripheral unit, and continuation of the processing of the control program by the error-free processor.

14. The control method as claimed in claim 13, wherein the test comprises the simultaneous execution of at least one test program by both the first and second processors, wherein one of the first or second processors is considered to have an error if at least one of the following conditions is met:

the processor has not processed the test program within a first time period T1;

the processor has not successfully processed the test program; and the processor has not gone into the state of rest for a second time period T2 after expiry of the first time period T1.

15. The control method as claimed in claim 13, wherein the synchronization error is evaluated and is assigned to an error type, wherein, for the checking of the first and second processors, at least one test program is selected as a function of the error type.

* * * * *

UNITED STATES PATENT AND TRADEMARK OFFICE
CERTIFICATE OF CORRECTION

PATENT NO.        : 8,959,392 B2                                       Page 1 of 1
APPLICATION NO.   : 13/636070
DATED             : February 17, 2015
INVENTOR(S)       : Adrian Traskov et al.

It is certified that error appears in the above-identified patent and that said Letters Patent is hereby corrected as shown below:

In the Claims

In Column 10, claim 6, line 52, after "multiplexer" insert --(91)--.

Signed and Sealed this
Ninth Day of June, 2015

Michelle K. Lee
*Director of the United States Patent and Trademark Office*